(12) United States Patent
Kattepur et al.

(10) Patent No.: US 11,602,847 B2
(45) Date of Patent: Mar. 14, 2023

(54) METHOD AND SYSTEM FOR ROBOTIC TASK PLANNING

(71) Applicant: Tata Consultancy Services Limited, Mumbai (IN)

(72) Inventors: Ajay Kattepur, Bangalore (IN); Balamuralidhar Purushothaman, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 266 days.

(21) Appl. No.: 16/942,433

(22) Filed: Jul. 29, 2020

(65) Prior Publication Data

US 2021/0049037 A1 Feb. 18, 2021

(30) Foreign Application Priority Data

Jul. 30, 2019 (IN) .............................. 201921030817

(51) Int. Cl.
*B25J 9/16* (2006.01)

(52) U.S. Cl.
CPC .......... *B25J 9/1664* (2013.01); *B25J 9/1661* (2013.01); *G05B 2219/39377* (2013.01); *G05B 2219/40113* (2013.01); *G05B 2219/40518* (2013.01)

(58) Field of Classification Search
CPC .................. B25J 9/1664; B25J 9/1661; G05B 2219/39377; G05B 2219/40113; G05B 2219/40518
See application file for complete search history.

(56) References Cited

U.S. PATENT DOCUMENTS 10,496,095 B1 * 12/2019 Bays ............... B64C 39/024
2016/0275092 A1 * 9/2016 Black ............... G06F 3/0484
(Continued)

FOREIGN PATENT DOCUMENTS

KR 20120061014 A 6/2012
KR 20170095583 A 8/2017

OTHER PUBLICATIONS

Cashmore, Michael, et al. "Rosplan: Planning in the robot operating system." *Twenty-Fifth International Conference on Automated Planning and Scheduling*. 2015.
(Continued)

*Primary Examiner* — Kira Nguyen
(74) *Attorney, Agent, or Firm* — Finnegan, Henderson, Farabow, Garrett & Dunner, LLP

(57) ABSTRACT

Robots are deployed for handling different tasks in various field of applications. For the robots to function, task planning is required to be done. During the task planning, goal setting is done, as well as actions to be executed for corresponding to each goal are decided. Traditionally, this is carried out first and then the robots start executing the task plan, thereby failing to capture any change in the environment the robots operate, post the task plan generation. Disclosed herein is a method and system for robotic task planning in which a task plan is generated and is executed. However if the task execution fails due to change in any of the parameters/factors, then the system dynamically invokes an adaptation and re-planning mechanism which either updates the already generated task plan (by capturing the change) or generates a new task plan, which the robot can execute to achieve the goal.

6 Claims, 12 Drawing Sheets

(56) References Cited

U.S. PATENT DOCUMENTS

| | | | | |
|---|---|---|---|---|
| 2017/0361461 | A1* | 12/2017 | Tan | B25J 19/021 |
| 2019/0340249 | A1* | 11/2019 | Connell, II | G06F 40/58 |
| 2020/0005162 | A1* | 1/2020 | Kattepur | G06N 5/02 |
| 2020/0319640 | A1* | 10/2020 | Vogel | A47L 9/2842 |

OTHER PUBLICATIONS

Kuhner, Daniel, et al. "Closed-loop robot task planning based on referring expressions" *2018 IEEE/RSJ International Conference on Intelligent Robots and Systems (IROS)*. IEEE. 2018.

Jiang, Yuqian, et al. "Integrating task-motion planning with reinforcement learning for robust decision making in mobile robots." *arXiv preprint arXiv:1811.08955* (2018).

Kattepur, Ajay, and P. Balamuralidhar. "RoboPlanner: Towards an Autonomous Robotic Action Planning Framework for Industry 4.0." (2019).

* cited by examiner

METHOD AND SYSTEM FOR ROBOTIC TASK PLANNING

PRIORITY CLAIM

This U.S. patent application claims priority under 35 U.S.C. § 119 to: India Application No. 201921030817, filed on 30-Jul.-2019. The entire contents of the aforementioned application are incorporated herein by reference.

TECHNICAL FIELD

The disclosure herein generally relates to robotics, and, more particularly, to a method and system for task planning in a robotic environment.

BACKGROUND

Robots are used in various domains for the purpose of automating various activities. For example, robots are used in warehouses to handle picking, placing, and even packing of items/goods for which customer order may have been received. When any such task is assigned to a robot, task planning is one of the primary steps to be carried out. During the task planning, a task plan is generated which is further executed by the robot so as to perform the assigned task. For example, when a robot is to pick an item placed in a particular shelf in the warehouse, the robot needs to be aware of exact location of the item (which may be defined in terms of shelf number, and raw and column numbers), as well as route to reach that particular location.

The inventors here have recognized several technical problems with such conventional systems, as explained below. In some of the existing systems, a centralized system manages the task planning activity. Disadvantage of such systems is that the robots deployed for task execution are required to be in communication with the centralized system, which means if the connection is terminated/interrupted (due to bad network or any other reason), the task execution is adversely affected. Such systems may also require user intervention during the task planning. Also, when the robots operate on a fixed plan, they fail to capture any change in any of the parameters associated with the plan, which may result in failure of the plan.

SUMMARY

Embodiments of the present disclosure present technological improvements as solutions to one or more of the above-mentioned technical problems recognized by the inventors in conventional systems. For example, in one embodiment, a processor implemented method for task planning and execution in a robotic environment is provided. In this method, a design time planning is performed to generate a first task plan corresponding to a task, via one or more hardware processors. Further, the first task plan is executed using at least one robot in the robotic environment, via the one or more hardware processors. Further, a plurality of observations corresponding to the execution of the first task plan are fetched, via the one or more hardware processors. Then each of the plurality of observations is compared with the first task plan to detect any deviation from the first task plan, via the one or more hardware processors, and if any deviation is detected, a re-planning mechanism is invoked, via the one or more hardware processors. During the re-planning mechanism, it is determined whether the deviation is caused due to state change of any existing object or due to presence of any new object, or due to failure of at least one of a plurality of actions in the first task plan. If the deviation is caused due to state change of at least one object, then the first task plan is updated to capture the state change of the at least one object and then the updated first task plan is executed using the at least one robot, via the one or more hardware processors. If the deviation is caused due to presence of at least one new object, then one or more perception queries are triggered to collect details of the at least one new object, and then a second task plan capturing the details of the at least one new object is generated. Then the second task plan is executed using the at least one robot, via the one or more hardware processors. If the deviation is caused due to failure of at least one of a plurality of actions in the first task plan, then one of a low granularity approach or a high granularity approach is selected and executed to update the first task plan.

In another aspect, a system is provided. The system comprising one or more communication interfaces, one or more hardware processors, and one or more memory modules storing a plurality of instructions, wherein said plurality of instructions, when executed, cause the one or more hardware processors to perform a design time planning to generate a first task plan corresponding to a task; execute the first task plan using at least one robot in the robotic environment; fetch a plurality of observations corresponding to the execution of the first task plan; compare each of the plurality of observations with the first task plan to detect any deviation from the first task plan; and invoke a re-planning mechanism if any deviation is detected. During the re-planning mechanism, it is determined whether the deviation is caused due to state change of any existing object or due to presence of any new object, or due to failure of at least one of a plurality of actions in the first task plan. If the deviation is caused due to state change of at least one object, then the first task plan is updated to capture the state change of the at least one object and then the updated first task plan is executed using the at least one robot, via the one or more hardware processors. If the deviation is caused due to presence of at least one new object, then one or more perception queries are triggered to collect details of the at least one new object, and then a second task plan capturing the details of the at least one new object is generated. Then the second task plan is executed using the at least one robot, via the one or more hardware processors. If the deviation is caused due to failure of at least one of a plurality of actions in the first task plan, then one of a low granularity approach or a high granularity approach is selected and executed to update the first task plan.

In yet another aspect, a non-transitory computer readable medium for task planning and execution in a robotic environment is provided. The non-transitory computer readable medium performs a design time planning to generate a first task plan corresponding to a task, via one or more hardware processors. Further, the non-transitory computer readable medium executes the first task plan using at least one robot in the robotic environment, via the one or more hardware processors. Further, a plurality of observations corresponding to the execution of the first task plan are fetched, via the one or more hardware processors. Then each of the plurality of observations is compared with the first task plan to detect any deviation from the first task plan, via the one or more hardware processors, and if any deviation is detected, a re-planning mechanism is invoked, via the one or more hardware processors. During the re-planning mechanism, it is determined whether the deviation is caused due to state change of any existing object or due to presence of any new object, or due to failure of at least one of a plurality of actions in the first task plan. If the deviation is caused due to state change of at least one object, then the first task plan is updated to capture the state change of the at least one object and then the updated first task plan is executed using the at least one robot, via the one or more hardware processors. If the deviation is caused due to presence of at least one new object, then one or more perception queries are triggered to collect details of the at least one new object, and then a second task plan capturing the details of the at least one new object is generated. Then the second task plan is executed using the at least one robot, via the one or more hardware processors. If the deviation is caused due to failure of at least one of a plurality of actions in the first task plan, then one of a low granularity approach or a high granularity approach is selected and executed to update the first task plan.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
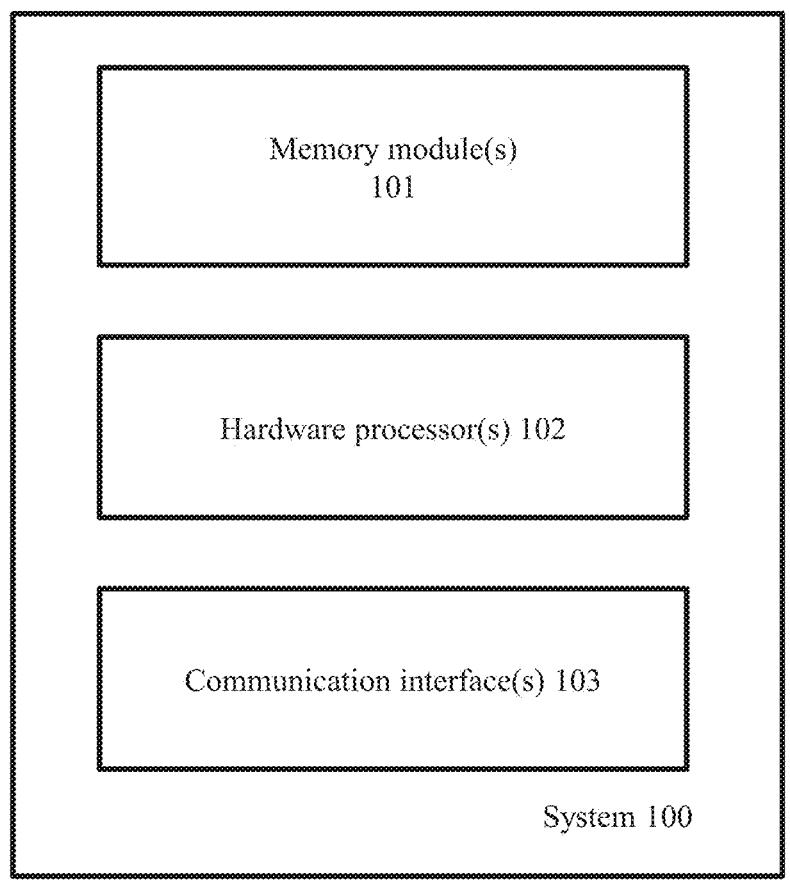
FIG. 1 illustrates an exemplary system for task planning in a robotic environment, according to some embodiments of the present disclosure.

FIG. 1 illustrates an exemplary system for task planning in a robotic environment, according to some embodiments of the present disclosure.

The system 100 includes one or more hardware processors 102, communication interface(s) or input/output (I/O) interface(s) 103, and one or more data storage devices or memory module 101 operatively coupled to the one or more hardware processors 102. The one or more hardware processors 102 can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The communication interface(s) 103 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the communication interface(s) 103 can include one or more ports for connecting a number of devices to one another or to another server.

The memory module(s) 101 may include any computer-readable medium known in the art including, for example, volatile memory, such as static random access memory (SRAM) and dynamic random access memory (DRAM), and/or nonvolatile memory, such as read only memory (ROM), erasable programmable ROM, flash memories, hard disks, optical disks, and magnetic tapes. In an embodiment, one or more modules (not shown) of the system 100 can be stored in the memory 101.

Figure 11:
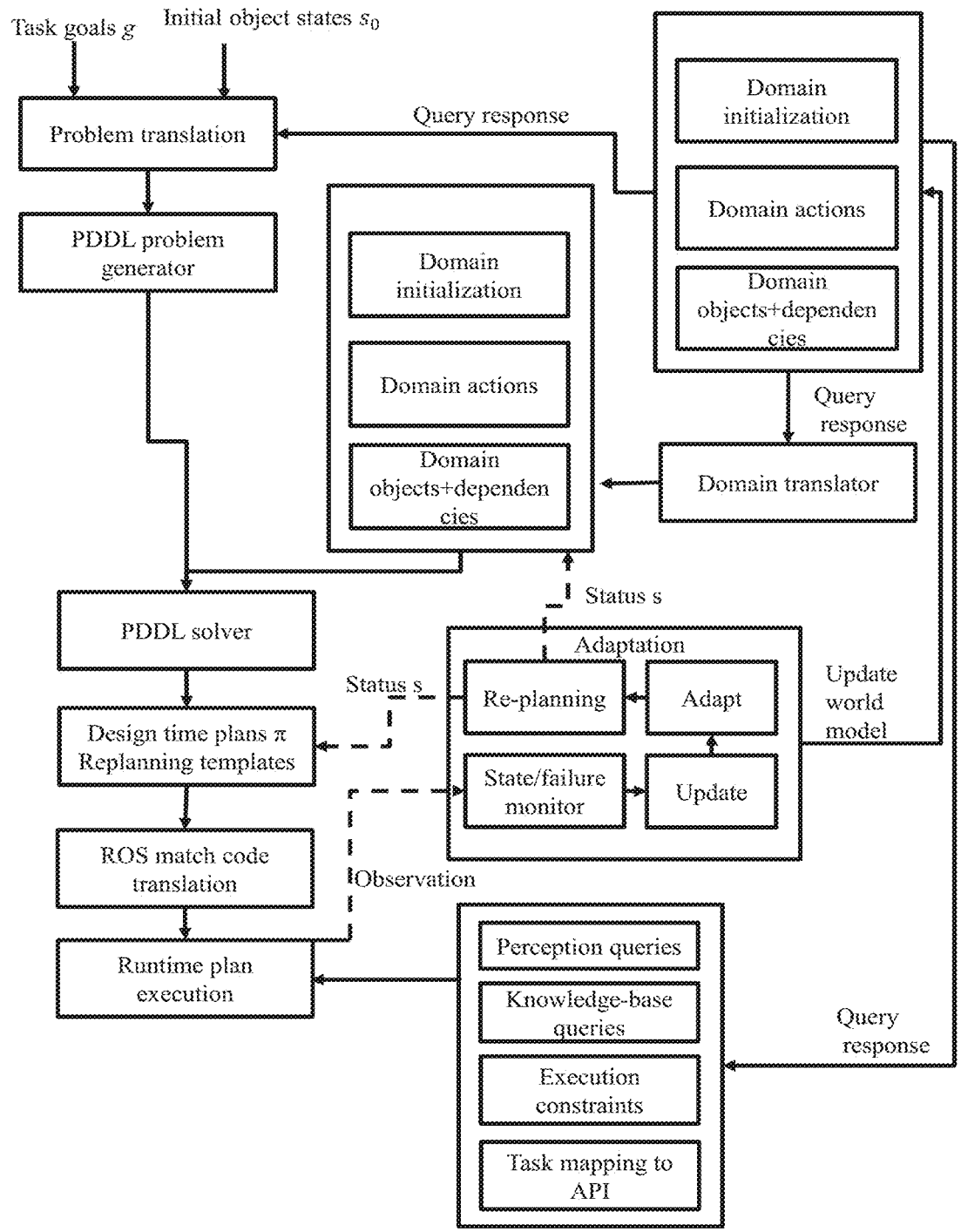
FIG. 11 is a flow diagram depicting data flow associated with various stages of task planning being performed by the system of FIG. 1, in accordance with some embodiments of the present disclosure.

The system 100 is configured to perform the robotic task planning, which is explained in description of FIG. 2 to FIG. 6. The system 100 may be implemented in a plurality of ways. In an embodiment, the system 100 is configured to be in communication with a plurality of robots in a robotic environment, and is further configured to perform the task planning for each of the plurality of robots. In another embodiment, one system 100 each is part of each of the plurality of robots, which enables each of the plurality of robots to perform the task planning (and execution) which allows each of the plurality of robots to perform tasks without requiring real-time control or coordination from any external entity (wherein the term 'external entity' can refer to another robot, and/or a central command centre). Functions of each component of the system 100 of FIG. 1 are explained in conjunction with the method steps depicted from FIG. 2 to FIG. 6. Also, FIG. 11 depicts data flow associated with various stages of the task planning being performed by the system 100, in an example mode of implementation, the various steps of which are explained in conjunction with the method steps depicted from FIG. 2 to FIG. 6.

Figure 2:
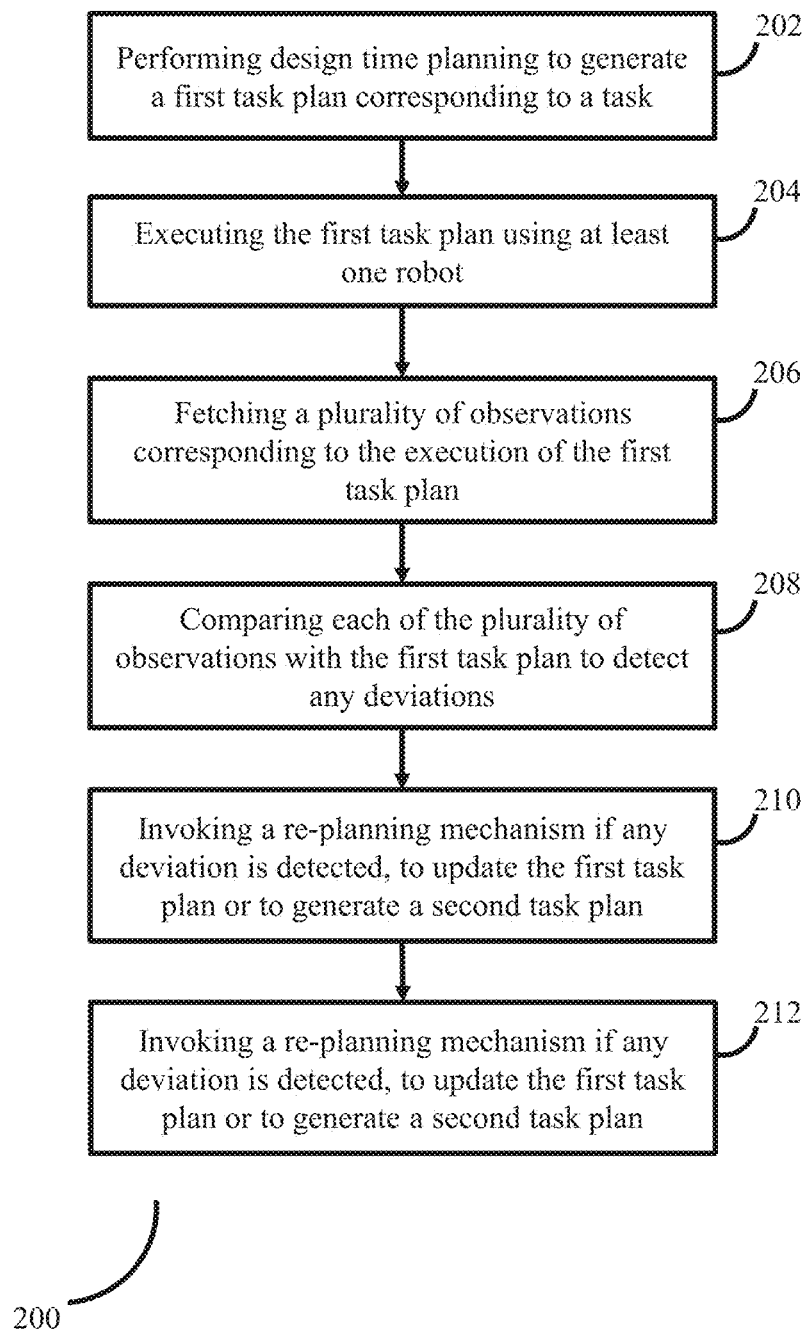
FIG. 2 is a flow diagram depicting steps involved in a process of task planning using the system of FIG. 1, according to some embodiments of the present disclosure.

FIG. 2 is a flow diagram depicting steps involved in the process of task planning using the system of FIG. 1, according to some embodiments of the present disclosure. When a task is assigned to a robot, the system 100 initially performs (202) design time planning to generate a first task plan corresponding to the task assigned. During the design time planning, the system 100 defines a 'problem domain' matching the assigned task. The 'problem domain' consists of information related to types of objects in the domain, state information corresponding to each of the objects provided as 'predicates' and information on action transitions that result in state changes defined as 'durative-actions'. The object type may correspond to the robot, an item to be picked up, etc. which may form part of the task plan in terms of presence in an area where the task is to be executed, or in terms of an action to be performed on as part of the task. The state information of any object at any given point of time represents/indicates state in which that particular object is in, during that instance. The predicates are used in describing the durative-actions, which specify the condition and effect of transitions. The actions are specified with a duration, with predicates used to describe conditions and effects that happen at start, at end, and overall the durative action. The code snippet given below represents this process.

```
(:types world_model robot gripper hold_target operate_target
control_target goal_target )
(:predicates (non - perceived ?a - world_model)
( perceived ?a - world_model )
( undetected ?d - hold_target
?b - robot)
( detected ?d - hold_target ?b - robot))
(:durative-action Detection_high
:parameters (?d - hold_target ?f - operate_target
?m - control_target ?b - robot)
    :duration (= ?duration 100)
:condition ( and (at start ( undetected ?d ?b))
(at start (reach - target - position ?b))
( over all ( opened ?f))
( over all ( unlocked ?m)))
:effect ( and (at end ( detected ?d ?b))
(at end ( not ( undetected ?d ?b)))
(at end ( increase ( action_cost ) 80) )))
```

Information pertaining to description of a problem to be solved in response to the task assigned, is fed as input for the task planning. The 'description of the problem' may contain data such as but not limited to objects, initial state/stage of each of the objects, goal state/stage, and metrics to be planned for. The 'metrics' contain 'metric conditions' which convey specific requirements. For example, if the task plan is to be designed/generated such that overall task time is reduced, then this requirement forms one of the metric conditions to be satisfied during the task planning.

The code snippet below shows initialization of objects, goal states, and metric condition.

```
(:init           ( perceived world)
                 ( opened door)
                 ( unlocked cupboard)
                 (reach -home - position youbot )
                 ( neutral - position youbot_gripper )
                 ( detected ball youbot )
                 ( rack_location ball)
                 (= ( action_cost ) 0))
(:goal           ( and ( bin_location ball bin)
                 (reach -home - position youbot )))
(:metric         minimize total - time )))
```

Figure 4:
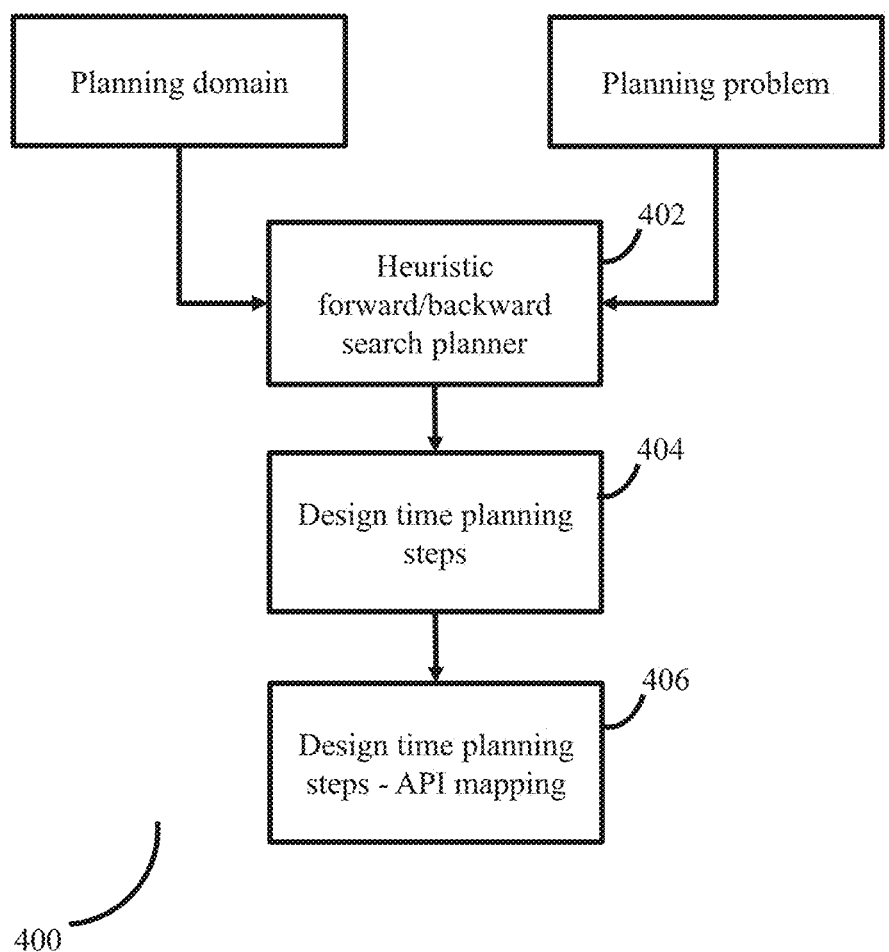
FIG. 4 depicts steps involved in the process of generating the first task plan by executing the design time planning, using the system of FIG. 1, according to some embodiments of the present disclosure.

The system 100 may use any suitable existing planner and planning mechanism to generate the task plan, based on the information pertaining to the planning domain and the planning problem. The generated task plan (also referred to as 'first task plan') specifies a sequence of actions to be executed by the robot so as to perform the assigned task. For example, if the task assigned to the robot is picking up an object from a shelf in a warehouse, the task plan specifies that the robot has to move in certain direction for certain distance so as to reach a target shelf, and after reaching the location of the shelf the robot needs to detect the object, and then grab the object by moving the arm, and then direction and path plan (in terms of direction and distance) to reach a location where the grabbed object is to be dropped/placed, and then drop/place the object. Such steps in the task plan are referred to as "design time plan steps". This process of generating the (first) task plan is depicted in FIG. 4, and the code snippet given below shows an example of such a task plan generated by the system 100.

```
Time: ACTION

0 .000: Robot_movement_door_fast World Youbot
50 .000: Robot_movement_target_fast World
Youbot Door
100 .000: Detection_low Ball1 Door Cupboard Youbot
. . .
340 .000: Dropping_object_fast World Youbot Ball1
Bin Youbot_gripper1
370 .000: Perception_low World
410 .000: Robot_movement_home_fast World Youbot
Door
```

During the task planning, the system 100 considers a restricted state transition, wherein the restricted state transition is defined as a 3-tuple $$\Sigma = (S, A, \gamma) \quad — (1)$$

Where,
$S = \{s_1, s_2, \ldots s_n\}$ is a finite set of states;
$A = \{a_1, a_2, \ldots a_m\}$ is a finite set of actions;
$\gamma : S * A * E \rightarrow 2^s \rightarrow$ is a state transition function.

Given a state transition $\Sigma$, purpose of the planning is to find out which actions to apply to which states in order to achieve some objective when starting from a given situation. To elaborate this further, the following theoretic notation is considered:

Let $L = \{p_1, p_2, \ldots p_n\}$ be a finite set of proposition symbols. A planning domain on L is restricted state transition $\Sigma = (S, A, \gamma)$ such that:

Each state s∈S is a subset of $2^L$. If p∈s, then proposition p holds in state of the world represented by s.

Each action a∈A is a triple of subsets L, represented as α=(precond(a),effects⁻(a),effects⁺(a)). The set precond (a) is called preconditions of a, and the sets effects⁻(a), effects⁺(a) are called effects of a. These two sets of effects are disjoint sets effects⁺(a) ∩ effects⁻(a)=ø. The action a is applicable to a state s if precond(a) is a subset of s.

S has a property that if s∈S, then, for every action a that is applicable to s, the set of (s−effects⁻(a)) ∪effects⁺(a)∈S i.e. whenever an action is applicable to a state, it produces another state.

The planning problem considered is a triple P=(Σ,$s_0$,g), where $s_0$ is an initial state and is a member of S. g is a subset of L and is a set of propositions known as goal propositions that give the requirements that a state must satisfy in order to be a goal state. The set of goal state is $S_g$={s∈S|g is a subset of s}

The plan is any sequence of actions π=($a_1$, ..., $a_k$), where k>0. The length of the plan is |π|=k, the number of actions. If $π_1$=($a_1$, ..., $a_k$) and $π_2$=($a'_1$, ..., $a'_j$) are plans, then their concatenation $π_1$. $π_2$=($a_1$, ..., $a_k$, $a'_1$ ..., $a'_j$) is the plan. A solution π is redundant if there is a proper subsequence of π that is also a solution of P; π is minimal if no further solution plan for P contains fewer actions than π. Information that the system 100 may have during execution of the plan is also part of this model. Partial knowledge about the state can be modeled as an observation function ρ: S→O that maps S into some discrete set O=$O_1$, $O_2$, ... $O_k$ of possible observations. For the plan execution, data considered by the system 100 is observation o=ρ(s) corresponding to current state.

During the heuristic forward/backward search planning being done by the system 100, for a given high level goal state g, there are multiple combinations of actions and states that may be chosen from the initial state $s_0$. An optimal action from the available actions is selected by considering metrics that indicate how close an action result is to a goal state. For any action a applicable to a state s, next state is given by the transition function: γ(s, a)=(s−effects⁻(a))∪effects⁺(a). In this function, even if effects⁺(a) brings result closer to g, effects⁻(a) would negate it. As a result, a relaxation criterion is applied, in which effects⁻(a) is neglected. The heuristic functions given below are based on this relaxation criterion.

Consider a state s∈S, a proposition p, and a set of propositions g. A minimum distance from s to p, denoted as Δ*(s, p), is the minimum number of actions required to reach from s to a state containing p. The minimum distance from s to g, Δ*(s, g), is the minimum number of actions required to reach from s to a state containing all propositions in s to g.

The system 100 estimates a heuristic estimate A using a minimum distance graph searching algorithm. This algorithm proceeds from a state s, through each action whose preconditions have been reached, until a fixed point is reached. Given a planning problem where each action a has a cost cost(a), the algorithm defines distance to a proposition P or to a goal g to be the cost of achieving P or g. In this algorithm, π is the current partial plan with an initial function call Heuristic-Forward-Search (<>, $s_0$, g, A), where < > is an empty plan, which is iteratively updated with actions a satisfying preconditions at each step. This can be achieved using any suitable approach such as but not limited to a greedy search algorithm or with a best-first search. This knowledge is used by the system 100 during the task planning.

Figure 6:
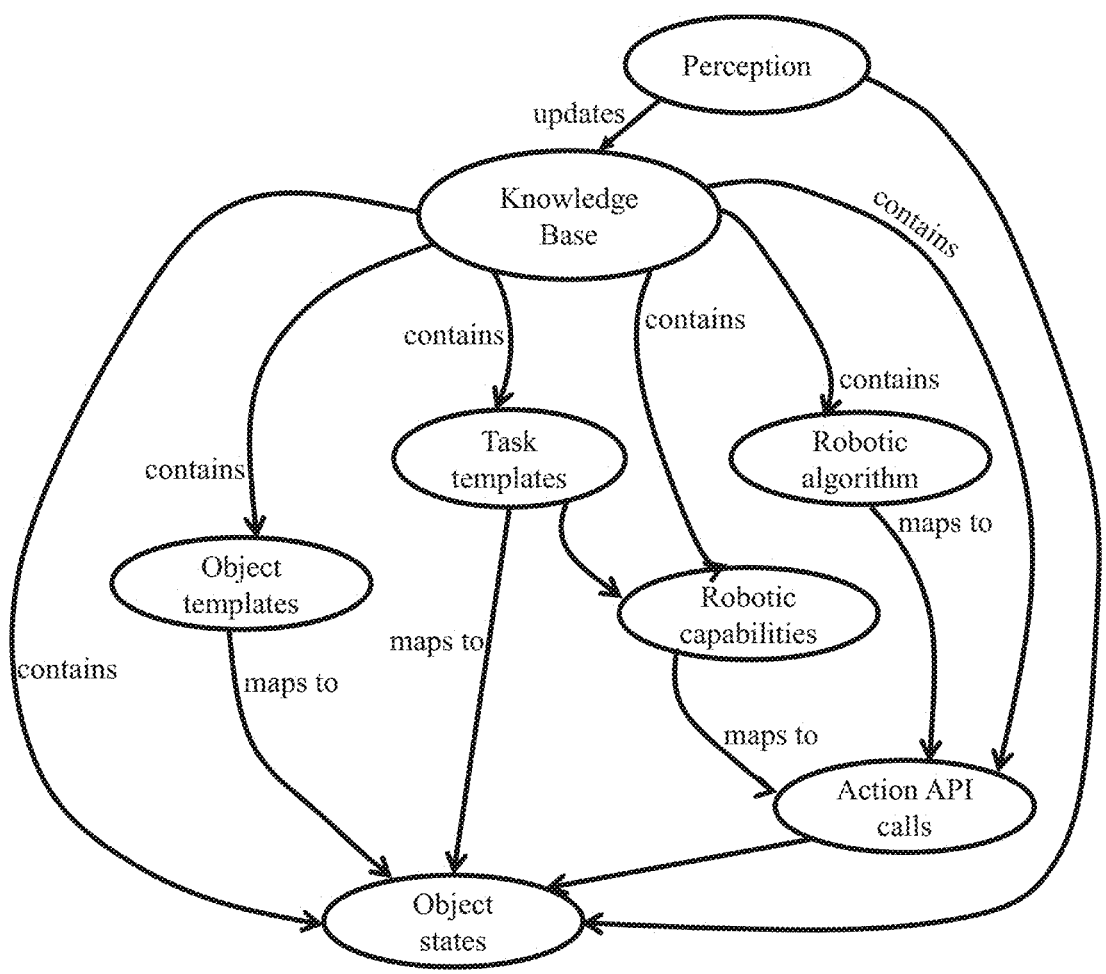
FIG. 6 is an example of knowledgebase being used by the system of FIG. 1, for the task planning, in accordance with some embodiments of the present disclosure.

The system 100 requires information pertaining to a plurality of other data during the task planning. Such data is maintained in the form of a knowledge base. The knowledge base provides the system 100, a consistent view of the world model, objects, state changes, robotic capabilities and algorithms of interest. The knowledge base is also configured to capture data pertaining to semantic relationship between the objects, robotic entities and tasks. In order to capture this, the system 100 may use graph databases, that store data and semantic relationships graphically—the nodes and execution of tasks. An example of the knowledge base is depicted in FIG. 6. As in FIG. 6, two types of events cause changes in the knowledge base: actions and perceptions. While the actions cause changes in state of the objects, the perceptions causes current object state to be recorded. This data may be queries to extract information pertaining to current state and details of objects in the world model. An example of querying currentState of objects using Gremlin query language is given below:

```
gremlin> g.V.has('key','World_Model').
outE('currentState').inV.key
==>Non-Perceived
gremlin> g.V.has('key','Robot-Location').
outE('currentState').inV.key
==>Robot-Home-Position
gremlin> g.V.has('key','Target-Location').
outE('currentState').inV.key
==>Off-Target
```

The system 100 may be configured to generate task plans on the fly i.e. the system 100 can generate a new task plan if required, or may update an existing task plan as needed. For this purpose, the system 100 may also maintain a domain file consisting: (a) Action description, describing a possible action that may be performed in relation to an environment, (b) Precondition, a conjunction of atoms which specify what must be true before an operator may be applied, (c) Effects, is a conjunction of literals which define situation changes after application of an operator. This data along with a problem file consisting object and state initialization, goal conditions and minimization metrics is input for dynamic/on the fly task planning, using any appropriate technique. For example, a state of art Planning Domain Definition Language (PDDL) can be used for the dynamic task planning. All such information may be further used by the system 100 for the design-time planning.

After generating the first task plan, the same is executed (204) by the robot in an orchestration phase. At this stage, each of a plurality of design time plan steps is mapped to corresponding Application Programming Interface (API), based on the information populated in an associated knowledge base (example of such a knowledge base is depicted in FIG. 6). Table. 1 below shows an example of how the API mapping is performed.

TABLE 1

| Category | Action task | Orchestrated API call |
|---|---|---|
| Perception | Perception | robot.camera_id.sensing >> robot.camera.id.edge detection >> knowledge_base_query |
| Base movement | Robot_movement | robot.mobile_base.path-planning >> robot.mobile_base.move-to-location |
| Manipulation | Robot_arm_movement | robot.gripper.movement-planning >> robot.gripper.movement |

TABLE 1-continued

| Category | Action task | Orchestrated API call |
|---|---|---|
| | Gripper_grasp | robot.gripper.grasping-planning >> robot.gripper.open-palm >> robot.gripper.close-palm |
| | Gripper_ungrasp | robot.gripper.ungrasp-planning >> robot.gripper.open-palm |

The code snippet given below represents an example of plan execution/orchestration by a robot.

```
val        state_world = {. perceived = " perceived ",
           non_perceived = "non - perceived " .}
val        API_mapping = {. sensing = " API
           robot.camera_id.sensing ", detection = " API
           robot.camera_id.edge_detection " , query =" API
           Knowledge_base_query .}
def        class robot_perception ( )=
def        sensing ( ) = API_mapping.sensing
def        edge_detection ( ) = API_mapping.detection
def        KB_query ( ) = API_mapping.query
def        percept ( ) = sensing ( ) >> edge_detection ( )
              >> KB_query ( ) >> Current World State :=
              state_world. perceived
stop
```

An example of the API calls made by the system 100 is given in the code snippet below:

| Timestamp | API Call |
|---|---|
| 31 | API robot.camera_id.sensing |
| 35 | API robot.camera_id.edge_detection |
| 38 | API Knowledge_base_query |
| 64 | Success Perception 20 seconds |
| 72 | Current World State perceived |
| 80 | API robot.mobile_base.path - planning |
| 84 | API robot.mobile_base.move -to - location door |
| 141 | Success Movement 50 seconds |
| 147 | Current Robot State Transition Location |
| FAIL | — Trigger Replanning for State Change |
| Next step: | Robot Move to Target |

After executing the first task plan, the system 100 fetches (206) information pertaining to a plurality of observations corresponding to the execution of the first task plan. The term 'observation' in this context refers to state changes during execution of each of the design time plan steps that form the first task plan. The system 100 then compares (208) each of the plurality of observations with the first task plan to detect any deviations. In addition to the design plan steps, the first task plan comprises an expected state change, action, corresponding to each of the design plan steps. By comparing the fetched observations with the first task plan, the system 100 checks for any deviation between the fetched observations and that in the first task plan. In various embodiments, the deviation may be in terms of at least one of a. state change of one or more objects, b. presence of a new object, or c. failure of any of the actions. If any deviation is detected, then the system 100 invokes (210) a re-planning mechanism to dynamically adjust to the change in environment (due to the state change or due to presence of the new object). If no deviation is detected, then the first task plan is continued.

In various embodiments, by virtue of the re-planning mechanism, the system 100 either updates/modifies the first task plan (an updated first task plan), or generates a second task plan. Details of the re-planning mechanism are covered in description of FIG. 3. The updated first task plan or the second task plan is further executed by the robot to reach one or more goals associated with the assigned task. An algorithm that may be executed by the system 100 for the task planning, adaptation and re-planning is given below:

```
Input: Plan π with states s_i and actions a_i, observations o_i→s_i,
       Problem P with transitions γ (s, a)
Output: set of execution actions a_i satisfying π plan, tracked
        state ST execution trace
Function Adaptive Execution (π, s, g, A):
    Initialize state tracker ST ← s_0;
    for each s_i in plan π do
        Execute action a_i mapping to transition γ(s_{i-1}, a_i) to generate
            observation o_i;
        if o_i maps correctly to s_i in the plan π then
            Update state tracker ST ← s_i;
            Execute action a_{i+1};
        else
            trigger re-planning with state ST;
Function Re-planning (π, s, g, A):
    while s does not satisfy g do
        π' ← Heuristic – Forward – Search (π, a, γ(s, a), g, A)
        If π' ≠ failure then
            return π
        else
            switch Plan inputs do
                case state change do
                    Trigger perception or knowledge base query;
                    Update observation o_i ← o'_i;
                    Change state of objects s ← s_i ;
                        π' ← Heuristic – Forward –
                        Search (π, a, γ(s, a), g, A)
                case Action alternatives do
                    Change actions A ← A';
                        π' ← Heuristic – Forward –
                        Search (π, a, γ(s , a), g, A)
            otherwise do
                trigger perception to detect object;
                Knowledge base query and updates;
                Add new objects and their states to problem P with
                transitions γ' (s, a);
                Solve problem P: π' ← Heuristic – Forward –
                Search (π, a, γ (s, a), g, A)
```

The system 100 may perform the heuristic search by executing the algorithm given below:

```
Input: π, s, a, , g, p
Output: π plan
Function Delta (s):
for each p do
    if p ∈ s then
        Δ(s, p) ← 0
    else
```

$$\Delta(s, p) \leftarrow \alpha$$
$$U \leftarrow \{s\}$$

```
while changes occur in the below updates do
    for each a such that ∃_u ∈ U, precond(a) is a subset of u do
        U ← {u} ∪ effects^+(a);
        for each p ε effects^+(a) do
```

$$\Delta(s, p) \leftarrow \min\left\{\Delta(s, p), \text{cost}(a) + \sum_{q \in \text{precond}(a)} \Delta(s, q)\right\}$$

```
return Δ(s, p);
Function Heuristic – Forward – Search (π, s , g, A);
If s satisfies g then
    return π
options← {a ∈ A| a applicable to s}
for each a ∈ options do
    Delta(γ(s, a))
while options ≠ ∅ do
    a ← arg min{Δ(γ(s, a), g)|a ∈ options s};
        options ← options – {a};
```

```
π' ← Heuristic – Forward – Search (π, a, γ(s, a), g, A)
If π' ≠ failure then
    return π
else
    return failure
```

In various embodiments, the steps in method 200 may be performed in the same order or in any possible alternate order. In another embodiment, one or more steps in method 200 may be skipped.

Figure 3:
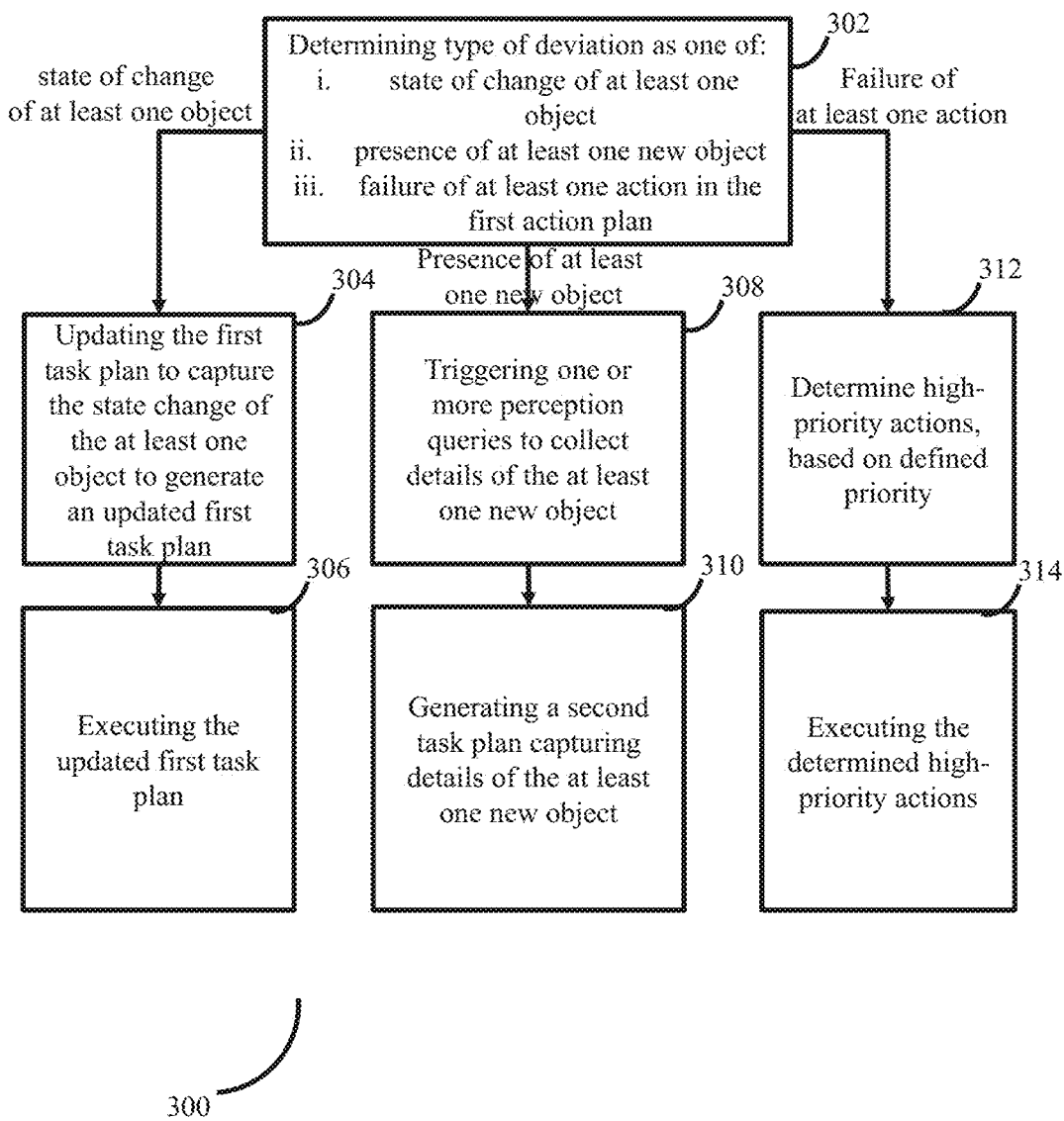
FIG. 3 is a flow diagram depicting steps involved in the process of performing a re-planning, using the system of FIG. 1, in accordance with some embodiments of the present disclosure.
Figure 5:
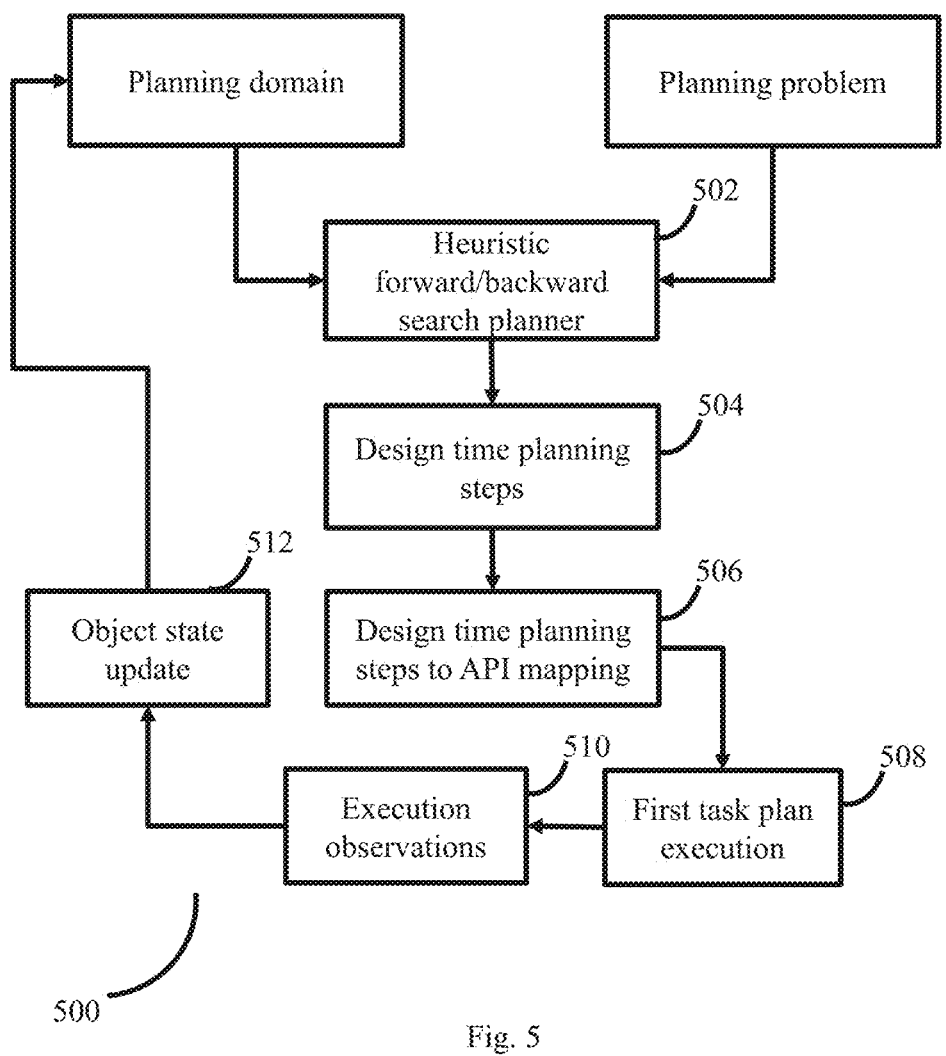
FIG. 5 depicts steps involved in the process of updating the first task plan, using the system of FIG. 1, in accordance with some embodiments of the present disclosure.

FIG. 3 is a flow diagram depicting steps involved in the process of performing a re-planning, using the system of FIG. 1, in accordance with some embodiments of the present disclosure. By comparing the fetched observations with that in the first task plan, the system 100 determines (302) type of deviation as one of: state of change of at least one object, presence of at least one new object, and/or failure of at least one action in the first action plan. If the deviation is in terms of state of change of at least one object, then the system 100 updates (304) the planning domain by capturing/including details of the determined state change, and then uses the updated planning domain as input to generate the task plan, which is the updated first task plan. This process is depicted in FIG. 5. An example of the state change is the first task plan expects an object 'door' in path of the robot to remain open. However if during the execution of the first task plan the door is detected as in a 'closed' state, then it is a deviation.

If the deviation is in terms of presence of at least one new object, then the system 100 triggers (308) one or more perception queries to collect details of the one or more new objects. Further, the collected details are used to form the planning problem and the problem domain, which is then used to generate (310) a second task plan.

Figure 7:
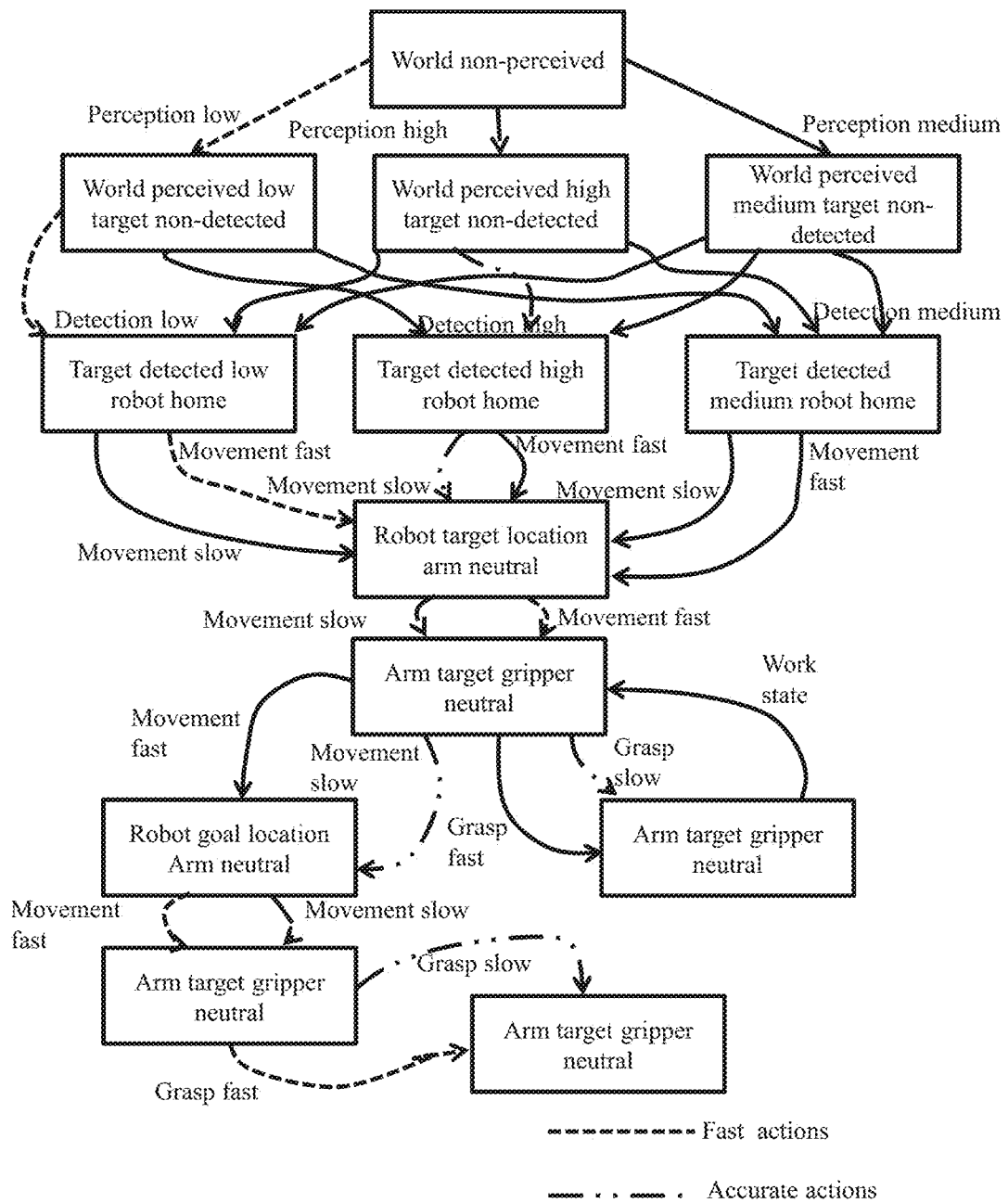
FIG. 7 depicts an example of priority based selection of actions for execution, in the event of failure of one or more actions in the first task plan, by the system of FIG. 1, in accordance with some embodiments of the present disclosure.

If the deviation is in terms of failure of an action, then the system 100 prioritizes and executes/performs only certain important actions. This is achieved based on information pertaining to priority of the actions, which may be pre-defined or dynamically defined. In case an action failure is detected, then the system 100 may skip certain steps, with a trade-off between accuracy, computational cost, and time required. The priority of actions may change based on requirements. For example, if time is a constraint, and accuracy can be compromised, then the actions are prioritized such that the task is executed within a certain period of time, with lesser accuracy. The requirements/criteria may be defined/specified in terms of the metric conditions. This process is explained further with reference to FIG. 7 which covers the scenario of the robot action of grabbing an item from the shelf in the warehouse failing due to the door and a cup-board remaining in closed state. In this situation, the system 100 may generate a new plan, and during the course of the new plan generation, certain 'fast' lower accuracy actions may be replaced with 'slower' high accuracy actions. For this purpose, a metric to be minimized in the problem file is modified from 'minimizing time' to 'reducing probability of action failures'. The code snippet below represents a failure of an action in the first task plan (which causes the system 100 to invoke the adaptation and re-planning).

| Time: Action |
| --- |
| 0 .000: Opening object slow World Youbot Door |
| 60 .000: Perception low World |
| 100 .000: Robot_movement_target_fast World Youbot Door |
| 150 .000: Unlocking object fast World Youbot Cupboard |
| 180 .000: Perception low World |
| 220 .000: Robot_arm_movement_fast World Youbot_gripper1 Youbot Ball1 Door Cupboard |
| 490 .000: Robot_movement_home_fast World Youbot Door |

As can be seen in the code snippet, the plan execution fails at the gripping action. Considering the metrics, a new plan is generated, which is further executed by the system 100. A code snippet depicting example of an updated plan is given below:

| |
| --- |
| 60 .000: Gripper grasp slow World Youbot_gripper1 Youbot Ball1 Door Cupboard |
| 90 .000: Holding object slow World Youbot Ball1 Door Cupboard Youbot_gripper1 |
| 150 .000: Perception_low World |
| 190 .000: Robot movement goal slow World Youbot Door |
| 280 .000: Gripper ungrasp slow World Youbot_gripper1 Youbot Ball1 Door Cupboard |

Code snippet representing API calls pertaining to the updated plan is given below:

| |
| --- |
| 194 API robot.camera_id.sensing |
| 196 API robot.camera_id.edge_detection |
| 198 API Knowledge_base_query |
| 225 Success Perception 24 seconds |
| 228 Current World State perceived |
| 232 API robot.mobile_base.path - planning |
| 234 API robot.mobile_base.move -to - location home |

In various embodiments, the steps in method 300 may be performed in the same order or in any possible alternate order. In another embodiment, one or more steps in method 300 may be skipped.

Experimental Results

Figure 8:
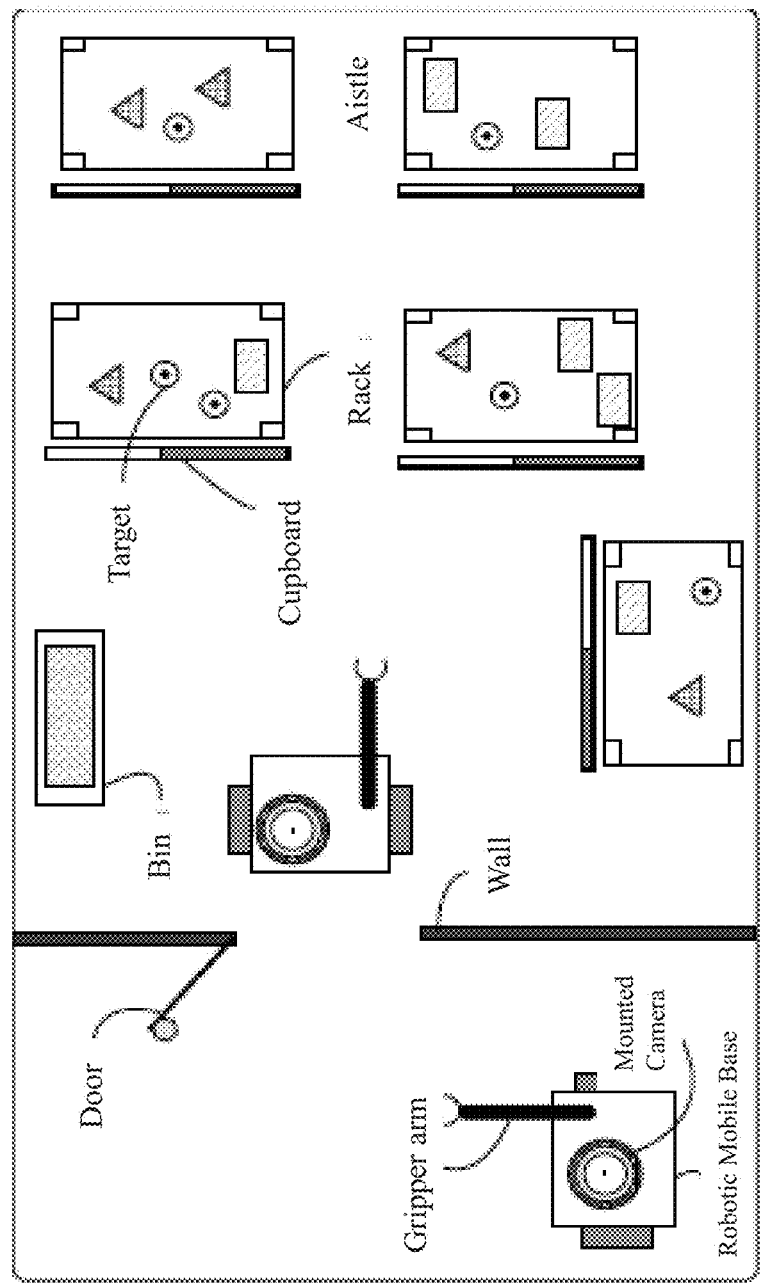
FIG. 8 depicts an example scenario of picking and placing an object from a rack in a warehouse, where the task planning can be performed using the system of FIG. 1, in accordance with some embodiments of the present disclosure.

In order to study performance and efficiency of the task planning being performed by the system 100, the task planning, execution, and adaptation were carried out for multiple scenarios described in FIG. 8. Table. 2 describes various scenarios for the system 100 to plan and execute.

TABLE 2

| Problem | Robot entities | Mobility | Target | Obstacles |
| --- | --- | --- | --- | --- |
| 1 | Single | No | Single | No |
| 2 | Single | Yes | Single | No |
| 3 | Single | Yes | Single | Yes |
| 4 | Single | Yes | Multiple | Yes |
| 5 | Multiple | Yes | Multiple | Yes |

Various scenarios covering simple problem covering a nearby target to complex problems with multiple targets, robots, and obstacles were considered as in Table. 2. State of art solvers LPG and SGPLAN having ability to handle temporal constraints, durative actions, numeric fluents, and parallel task scheduling were considered. Results obtained indicated that end to end latency of planned execution duration ranges from 500 to 1500 seconds, using top 5 optimal plans from LPG. A slight deterioration in quality of plans provided by SGPLAN was noticed when compared to that of LPG. Task steps increases with problem complexity, and upto 55 task steps were noticed. An increase in optimized metric value also was noticed with increase in task steps.

Figure 9:
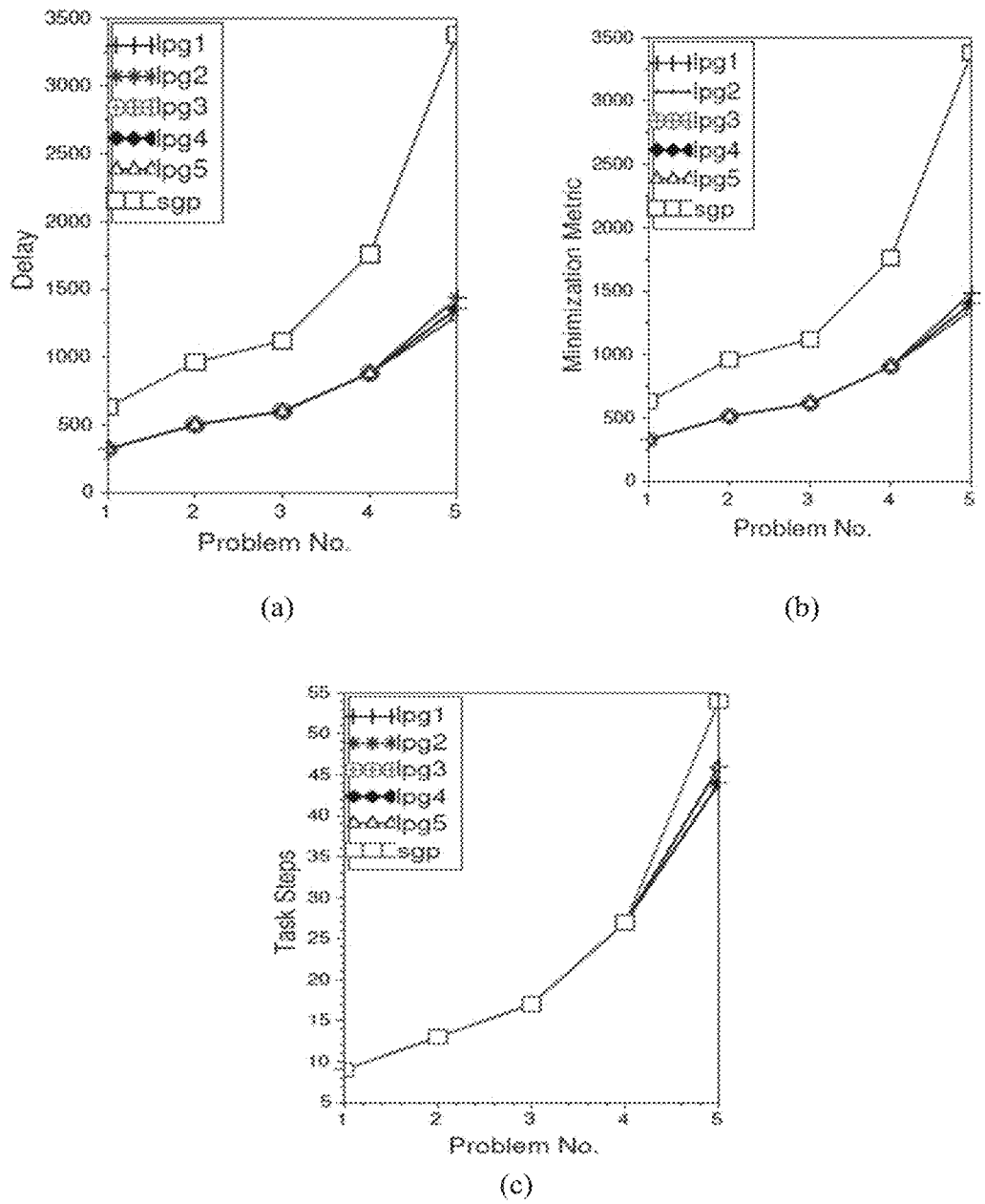
FIGS. 9 (a, b and c) are graphical representations of additional time duration caused due to re-planning of a task in different example scenarios, using the system of FIG. 1, in accordance with some embodiments of the present disclosure.

To study adaptation in execution with respect to state changes, output of the planner was integrated with a WeBots simulator. A time-line of performing the adaptive sequence with exponentially distributed execution times is presented in FIG. 9 (a, b, and c). The values indicated that there was a deterioration by 28% in overall latency for this run, when two stages of adaptation and re-planning occurred.

Figure 10A:
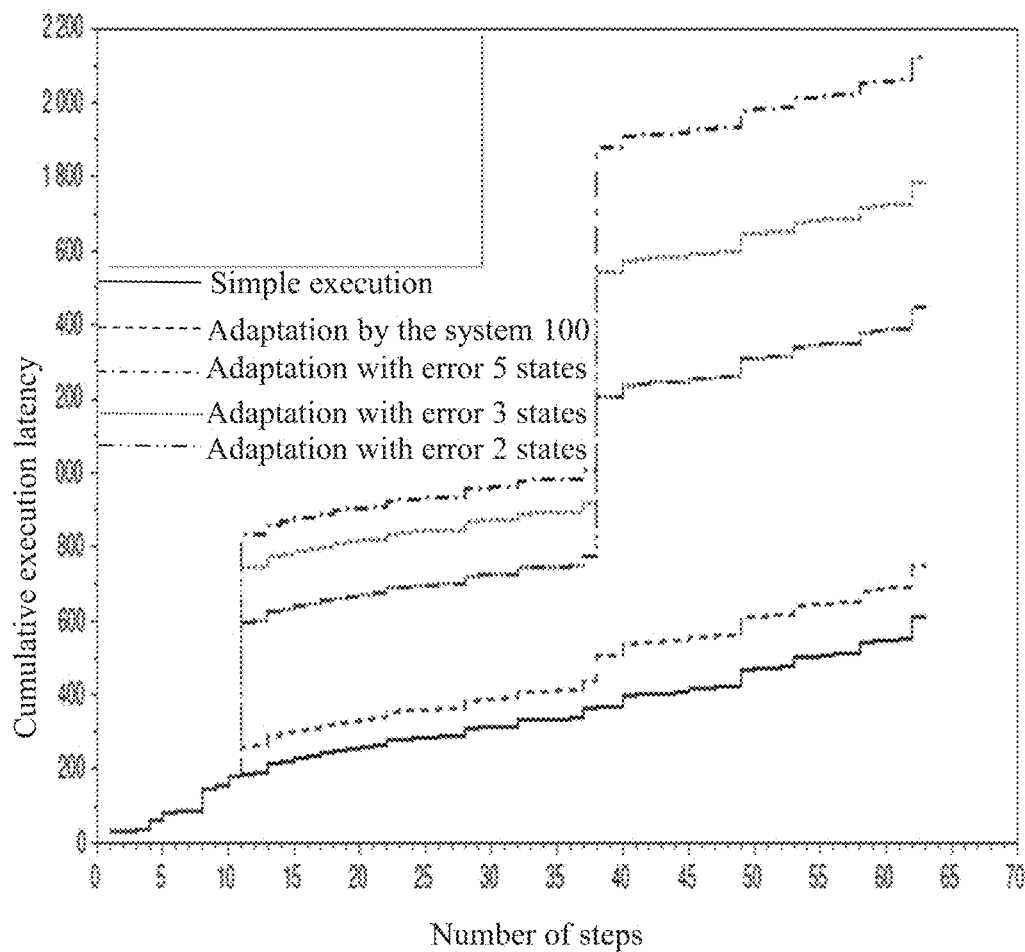
FIG. 10A is a graphical representation of execution timelines for simple and adaptive plans, using the system of FIG. 1, in accordance with some embodiments of the present disclosure.
Figure 10B:
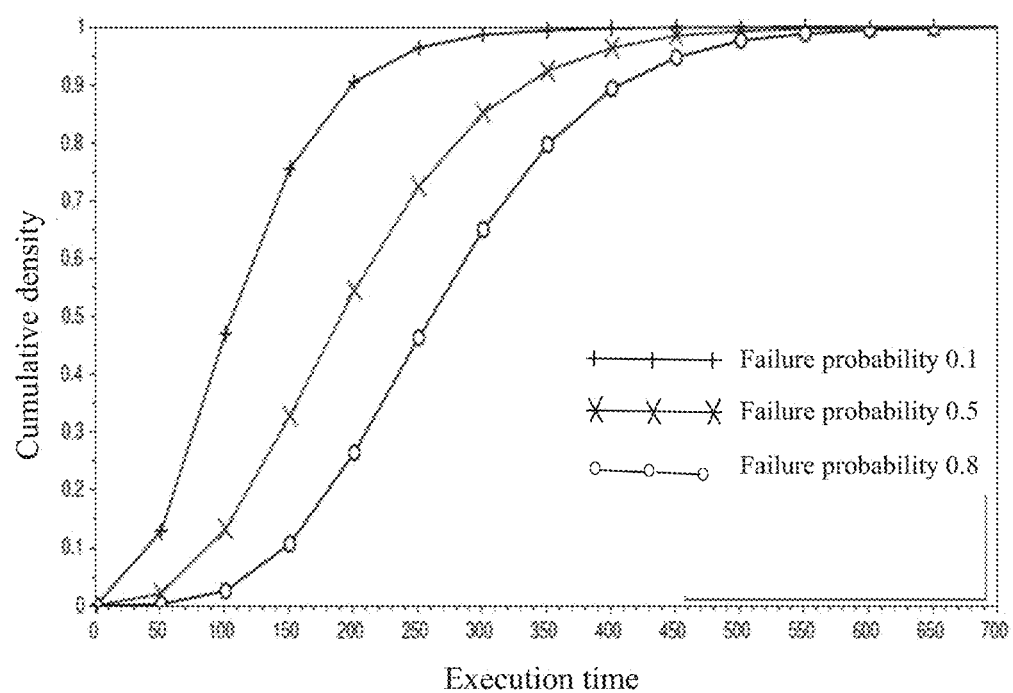
FIG. 10B is a graphical representation of execution times with plan failures, using the system of FIG. 1, in accordance with some embodiments of the present disclosure.

Further analysis on tradeoffs between increasing end to end execution times and probability of failures in execution are represented in FIG. 10A and FIG. 10B. It was noticed that cumulative execution times differ depending on the probabilities that execution fail to match intended plan tasks for 10000 Monte-Carlo runs. For each of these case adaptation and re-planning were invoked. For a specified planning problem, the end-t-end execution completed within 200 time units in 90% of the cases for failure probability 0.1, in 55% of the cases for failure probability 0.5, and in 25% of the cases for failure probability 0.9. These values help estimate execution times in automated tasks in warehouse environments. When there are increased level of ambiguity and possibility of obstacles, extended periods may be allocated for re-planning and adaptive execution.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A system for robotic task planning, comprising:
   one or more communication interfaces (103);
   one or more hardware processors (102); and
   one or more memory modules (101) storing a plurality of instructions,
   wherein said plurality of instructions, when executed, cause the one or more hardware processors (102) to:
      perform a design time planning to generate a first task plan corresponding to a task;
      execute the first task plan using at least one robot in the robotic environment;
      fetch a plurality of observations corresponding to the execution of the first task plan;
      compare each of the plurality of observations with the first task plan to detect any deviation from the first task plan; and
      invoke a re-planning mechanism if any deviation is detected, wherein the re-planning mechanism comprises:
         determining whether the deviation is caused due to state change of any existing object, or due to presence of any new object, or due to failure of at least one of a plurality of actions in the first task plan,
         wherein
         if the deviation is caused due to state change of at least one object:
            updating the first task plan to capture the state change of the at least one object; and
            executing the updated first task plan using the at least one robot;
         if the deviation is caused due to presence of at least one new object:
            triggering one or more perception queries to collect details of the at least one new object;
            generating a second task plan capturing the details of the at least one new object; and
            executing the second task plan using the at least one robot; and
         if at least one of a plurality of actions in the first task plan fails:
            selecting one of a low granularity approach or a high granularity approach; and
            executing the selected low granularity approach or a high granularity approach to update the first task plan.

2. The system as claimed in claim 1, wherein the robot generates the first task plan by executing the design time planning, comprising:
   collecting information pertaining to a planning domain and a planning problem corresponding to the task, as inputs;
   performing a heuristic forward/backward search planning on the collected information to determine a plurality of design time plan steps; and
   mapping each of the plurality of design time plan steps with corresponding Application Programing Interface (API).

3. The system as claimed in claim 1, wherein the robot updates the first task plan to capture the state change of the at least one object by:
   updating the information pertaining to the planning domain with information pertaining to state change of the at least one object, to generate an updated planning domain;
   performing the heuristic forward/backward search planning on the updated planning domain and the planning problem to generate a plurality of updated design time planning steps; and
   mapping each of the plurality of updated design time plan steps with corresponding Application Programing Interface (API).

4. A non-transitory computer readable medium for task planning and execution in a robotic environment, wherein the task planning and execution comprising:
   performing a design time planning to generate a first task plan corresponding to a task, via one or more hardware processors;
   executing the first task plan using at least one robot in the robotic environment, via the one or more hardware processors;
   fetching a plurality of observations corresponding to the execution of the first task plan, via the one or more hardware processors;
   comparing each of the plurality of observations with the first task plan to detect any deviation from the first task plan, via the one or more hardware processors; and
   invoking a re-planning mechanism if any deviation is detected, via the one or more hardware processors, wherein the re-planning mechanism comprises:
      determining whether the deviation is caused due to state change of any existing object or due to presence of any new object, or due to failure of at least one of a plurality of actions in the first task plan, wherein
      if the deviation is caused due to state change of at least one object:
         updating the first task plan to capture the state change of the at least one object; and
         executing the updated first task plan using the at least one robot, via the one or more hardware processors;
      if the deviation is caused due to presence of at least one new object:
         triggering one or more perception queries to collect details of the at least one new object;
         generating a second task plan capturing the details of the at least one new object; and
         executing the second task plan using the at least one robot, via the one or more hardware processors; and
      if at least one of a plurality of actions in the first task plan fails:
         selecting one of a low granularity approach or a high granularity approach; and
         executing the selected low granularity approach or a high granularity approach to update the first task plan.

5. The non-transitory computer readable medium as claimed in claim 4, wherein generating the first task plan by performing a design time planning comprises:
   collecting information pertaining to a planning domain and a planning problem associated with the task, as inputs;
   performing a heuristic forward/backward search planning on the collected information to determine a plurality of design time plan steps; and
   mapping each of the plurality of design time plan steps with corresponding Application Programing Interface (API).

6. The non-transitory computer readable medium as claimed in claim 4, wherein updating the first task plan to capture the state change of the at least one object comprising:
   updating the information pertaining to the planning domain with information pertaining to state change of the at least one object, to generate an updated planning domain;
   performing the heuristic forward/backward search planning on the updated planning domain and the planning problem to generate a plurality of updated design time planning steps; and
   mapping each of the plurality of updated design time plan steps with corresponding Application Programing Interface (API).

* * * * *